May 1, 1923.

J. A. EWELL 1,453,386

CLUTCH CONTROLLING MECHANISM FOR AUTOMOBILES

Filed Sept. 28, 1922

WITNESSES

INVENTOR
J. A. Ewell,
BY
ATTORNEYS

May 1, 1923.
J. A. EWELL
1,453,386
CLUTCH CONTROLLING MECHANISM FOR AUTOMOBILES
Filed Sept. 28, 1922
2 Sheets-Sheet 2
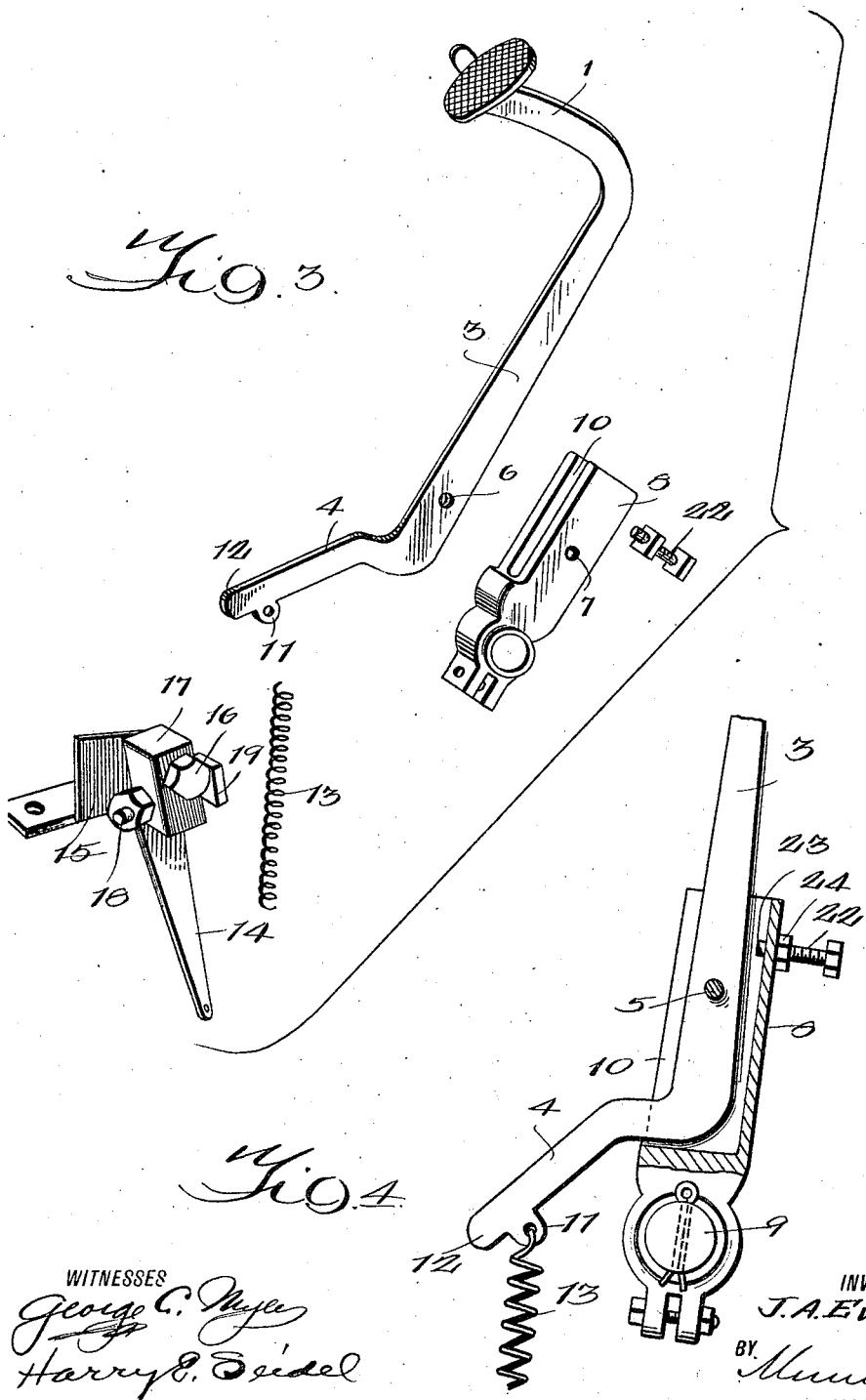

Patented May 1, 1923.

1,453,386

UNITED STATES PATENT OFFICE.

JOHN ALBERT EWELL, OF QUINAULT, WASHINGTON.

CLUTCH-CONTROLLING MECHANISM FOR AUTOMOBILES.

Application filed September 28, 1922. Serial No. 591,123.

*To all whom it may concern:*

Be it known that I, JOHN A. EWELL, a citizen of the United States, and a resident of Quinault, in the county of Grays Harbor and State of Washington, have invented certain new and useful Improvements in Clutch-Controlling Mechanism for Automobiles, of which the following is a specification.

This invention relates to a clutch controlling mechanism for automobiles and has for its object the provision of a device which will give the operator of an automobile an easier and more perfect control of his clutch, and at the same time will overcome the objectionable grabbing, incident upon actuation of the clutch to connect the drive shaft with the power shaft.

A further object of the invention is the provision of a clutch control in which the usual foot pedal is operated in advance of a separate lever which directly actuates the clutch and which has a retarded and independent movement for throwing the clutch in at the time that the clutch takes a firm hold for connecting the power shaft with the drive shaft through the usual transmission gearing.

The invention is illustrated by way of example in the accompanying drawings, in which:—

Figure 3 is a view in perspective of the parts forming my invention detached.

Figure 4 is a fragmentary view in section showing the operative relation between the foot pedal and the clutch lever.

Figure 1:
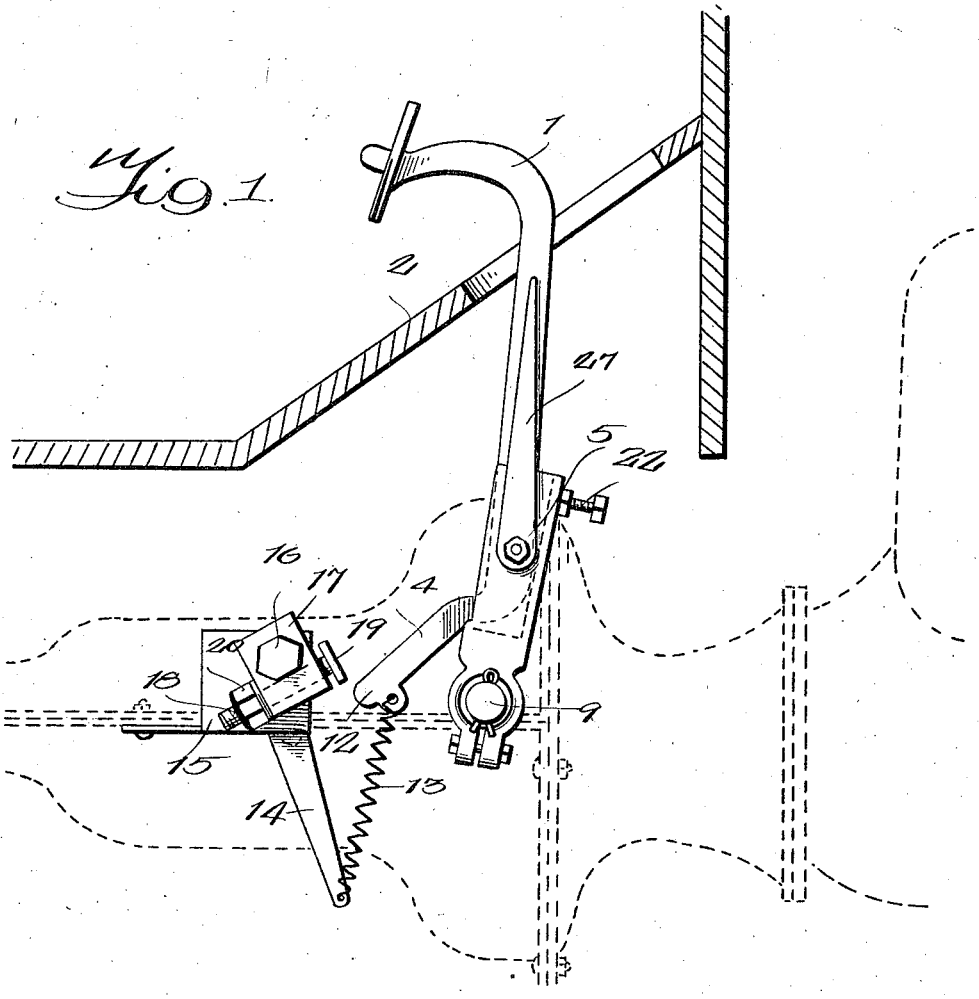
Figure 1 is a longitudinal side view of my improved clutch control applied to the transmission of an automobile.
Figure 2:
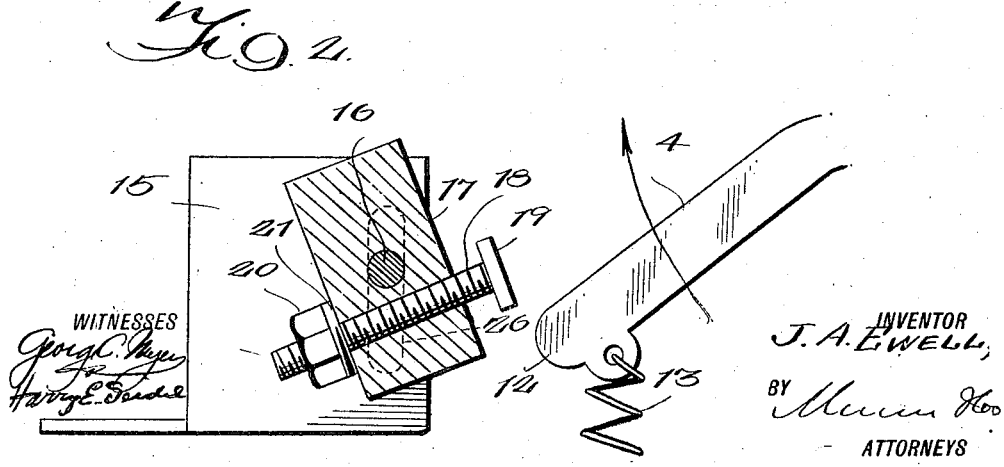
Figure 2 is a fragmentary view in detail with parts in section disclosing a side view of certain parts for retarding the throwing-in of the clutch.

Referring to the drawings, 1 indicates a foot-pedal operable through an opening in the foot-board 2 of an automobile. The foot-pedal is in the shape of a bell crank lever having the vertical arm 3 and a second arm 4 offset from the plane of the arm 3 and disposed at an angle to said arm.

The bell crank lever 1 is pivotally mounted on a bolt 5 inserted through a perforation 6 in the arm 3 and through aligned perforations 7 in a slotted lever 8.

The lever 8 is pivotally mounted on the usual rock shaft 9 and is provided with a longitudinal slot 10 in which the lower end of the arm 3 of the bell crank lever 1 is adapted to operate. The rock shaft 9 is mounted transversely of the transmission casing, as shown in dotted lines in Figure 1. A perforated ear 11 is formed adjacent the rounded free end 12 of the second arm 4 of the bell crank lever and provides means by which a coil spring 13 is connected to the arm 4 at one end, with the other end of the spring connected to a perforated end of a bracket arm 14 formed integrally or separately with a bracket 15. The bracket 15 is secured to any fixed part of the automobile and spaced from the free end 12 of arm 4.

Secured to the bracket 15 by means of a bolt 16 is a block 17. The block 17 is provided with a threaded transverse passage into which is screwed a set screw 18 having a head 19 adapted to be engaged at certain times with the rounded end 12 of the arm 4. A nut 20 and lock washer 21 is mounted on the opposite end of the set screw 18 for locking the set screw in any one of its adjusted positions.

In a threaded opening in the rear wall of the slot of the lever 8 is mounted a set screw 22 with the inner end 23 of said screw projecting into the slot 10 of the lever 8 and adapted to be engaged by the rear vertical edge of the arm 3 of the bell crank lever 1. A lock nut 24 on the set screw 22 is adapted to maintain the set screw in any one of its adjusted positions.

It will be seen from Figure 4, that as the end 23 of the set screw 22 is moved towards or away from the vertical edge of the arm 3 of the bell crank lever that said lever will engage said end and operate the lever 8 at an earlier or later point in the movement of oscillation of the bell crank lever.

The end 23 of the set screw 22, the rear vertical edge of the arm 3 of the bell crank lever 1, the rounded end 12 of the arm 4 of the bell crank lever, and the head 19 of the set screw 18 are case hardened to prevent wear of these parts due to the constant use of the same when operating the automobile.

The operation of my device is as follows: The set screw 22 is adjusted in order that the arm 3 of the bell crank lever 21 will engage the slotted lever 8 at the proper time and the adjustment of the screw will depend upon the make of the automobile.

When the foot pedal is moved to the right to release the clutch, the arm 4 of said lever will be moved upwardly with the rounded end 12 of said lever engaging the head 19 of the set screw 18. When this occurs the lever 1 will be rocked independently of the slotted lever 8 while a very slight movement of the lever 8 is had therefore it will be seen that in the first position of the movement of the oscillation of the lever 1 that some of the pressure ordinarily required to operate the foot pedal is relieved through the movement of the arm 4, spring 13 and the engagement of the rounded end 12 of the arm formed with the head 19 of the set screw 18.

When the clutch pedal is released to throw in the clutch the foot pedal 1 will travel back at a faster rate than the slotted lever 8 and at about the time when the clutch is taking a firm grip connecting the power shaft with the drive shaft, the speed of oscillation on the return of the lever 8 will be considerably retarded. The rounded end of the lever 4 engages the head 19 of the set screw 18 and rides over the same. The spring 13 will force the rounded end of the lever 4 to pass the head 19 and thereby continue the rearward rocking movement of the lever 1 while retarding slotted lever 8. The retardation of slotted lever 8 causes the clutch members to move slowly into engagement with each other and prevents the usual objectionable grabbing of the clutch.

The bracket 15 is provided with a slot 26 through which bolt 16 is passed. The position of the block 17 relative to the bracket may be changed by loosening bolt 16 and moving the same vertically in the slot 26 whereby said block is carried with the bolt.

It will be noted that the bolt 16 is mounted in the block 17 and as near to the screw 18 as is possible whereby the radial adjustment of the block 17 is effected through a very small arc of a circle.

Arm 27 forms no part of the invention and merely shows the relation of the usual foot pedal with respect to the various positions of the movable pedal 1.

I claim:—

1. In combination with a clutch, a lever for directly controlling the clutch provided with a longitudinal slot, a foot pedal in the form of a bell crank lever pivotally mounted in the slot with a vertical arm of the bell crank lever having one end seated in the slot, the second arm projecting outwardly from the slot, a set screw projecting into the slot and engageable with the vertical arm to limit movement of said arm in the slot, a bracket spaced from and mounted in a fixed position relative to the second arm, a spring connecting the bracket with the free end of the second arm, a set screw adjustable in the bracket and having a head adjacent the free end of the second arm, the free end of the second arm having a rounded portion adapted to engage the head of the last mentioned set screw when the foot pedal is operated whereby the slotted lever will be oscillated at a slower rate of speed than the foot pedal during certain periods of oscillation of said foot pedal.

2. In combination with a clutch, a slotted lever for directly controlling the clutch, a bell crank lever pivotally mounted in the slotted lever with one arm projecting outwardly from said lever, a bracket spaced from the projecting arm, resilient means connecting the free end of the projecting lever with the bracket, an adjustable set screw engageable with the projecting arm of the bell crank lever for retarding movement of the slotted lever when the bell crank lever is operated.

3. In combination with a clutch, a lever for directly controlling the clutch, a bell crank lever pivotally mounted on said lever, one arm of the bell crank lever projecting radially from the first mentioned lever, a spring for restraining oscillation of the bell crank lever, and means engageable with the radially projecting arm of the bell crank lever whereby the time of oscillation of the first mentioned lever is retarded relative to a similar operation of the bell crank lever.

4. In combination with a clutch, a lever for directly controlling the clutch, a foot pedal in the form of a bell crank lever pivotally mounted on the first mentioned lever and having one arm projecting outwardly from the first mentioned lever, resilient means for restraining oscillation of the bell crank lever, an adjustable set screw having its head located in the path of the end of the projecting arm of the bell crank lever with the free end of the arm engageable with the head of said set screw whereby when the bell crank lever is oscillated, the bell crank lever will move at a greater rate of speed than the first mentioned lever.

5. In combination with a clutch, a lever for directly controlling the clutch, a foot pedal in the form of a bell crank lever pivotally mounted on the first mentioned lever with means on the first mentioned lever adapted to engage the bell crank lever whereby oscillation of the bell crank lever will cause oscillation of the first mentioned lever, an arm of the bell crank lever projecting outwardly from the first mentioned lever, and means in the path of the said arm and engageable with said arm for causing the bell crank lever to be moved at a greater speed than the first mentioned lever when the bell crank lever is actuated to cause simultaneous operation of the first mentioned lever and the bell crank lever.

JOHN ALBERT EWELL.